United States Patent
Matsuda et al.

(10) Patent No.: US 7,050,038 B2
(45) Date of Patent: May 23, 2006

(54) ACTIVE-MATRIX SUBSTRATE AND DISPLAY DEVICE

(75) Inventors: Masahiro Matsuda, Mie (JP); Takaharu Yamada, Matsusaka (JP); Nobuyoshi Nagashima, Matsusaka (JP); Naofumi Kondo, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 345 days.

(21) Appl. No.: 10/459,547

(22) Filed: Jun. 12, 2003

(65) Prior Publication Data

US 2003/0234904 A1    Dec. 25, 2003

(30) Foreign Application Priority Data

Jun. 19, 2002  (JP) ............................. 2002-178231

(51) Int. Cl.
*G09G 3/36*    (2006.01)

(52) U.S. Cl. ..................... 345/103; 345/89; 345/92; 345/94; 345/95; 345/100; 345/87

(58) Field of Classification Search ........... 345/103, 345/77, 89, 92, 94, 95, 100, 147, 87; 349/152, 349/151, 43, 153
See application file for complete search history.

(56) References Cited

U.S. PATENT DOCUMENTS 6,052,172 A * 4/2000 Kajiwara et al. ............ 349/152
6,198,464 B1 * 3/2001 Ota et al. .................... 345/77
6,288,765 B1 * 9/2001 Tanaka et al. ............... 349/153
2002/0075422 A1 * 6/2002 Kimura et al. ................ 349/43
2003/0132906 A1 * 7/2003 Tanaka et al. ................ 345/89
2004/0196231 A1 * 10/2004 Goto et al. ................... 345/87

FOREIGN PATENT DOCUMENTS

| JP | 6-149174 | 5/1994 |
| JP | 11-119193 | 4/1999 |
| JP | 2000-029067 | * 1/2000 |

* cited by examiner

*Primary Examiner*—Vijay Shankar
*Assistant Examiner*—Prabodh Dharia
(74) *Attorney, Agent, or Firm*—Keating & Bennett,LLP

(57) ABSTRACT

An active-matrix substrate includes first and second trunk lines which are arranged so as to be spaced apart from, but adjacent to, each other and are supplied with signals electrically independently. First and second groups of lines include portions that are substantially parallel to each other. A first group of connecting pads for the first trunk line is located near the second trunk line such that each line of the first group is electrically connected to the first trunk line at an associated one of the connecting pads belonging to the first group near the second trunk line. A second group of connecting pads for the second trunk line is provided near the first trunk line such that each line of the second group is electrically connected to the second trunk line at an associated one of the connecting pads of the second group near the first trunk line.

24 Claims, 10 Drawing Sheets

PRIOR ART

*PRIOR ART*

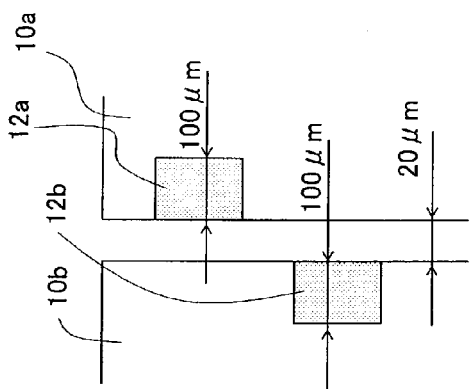
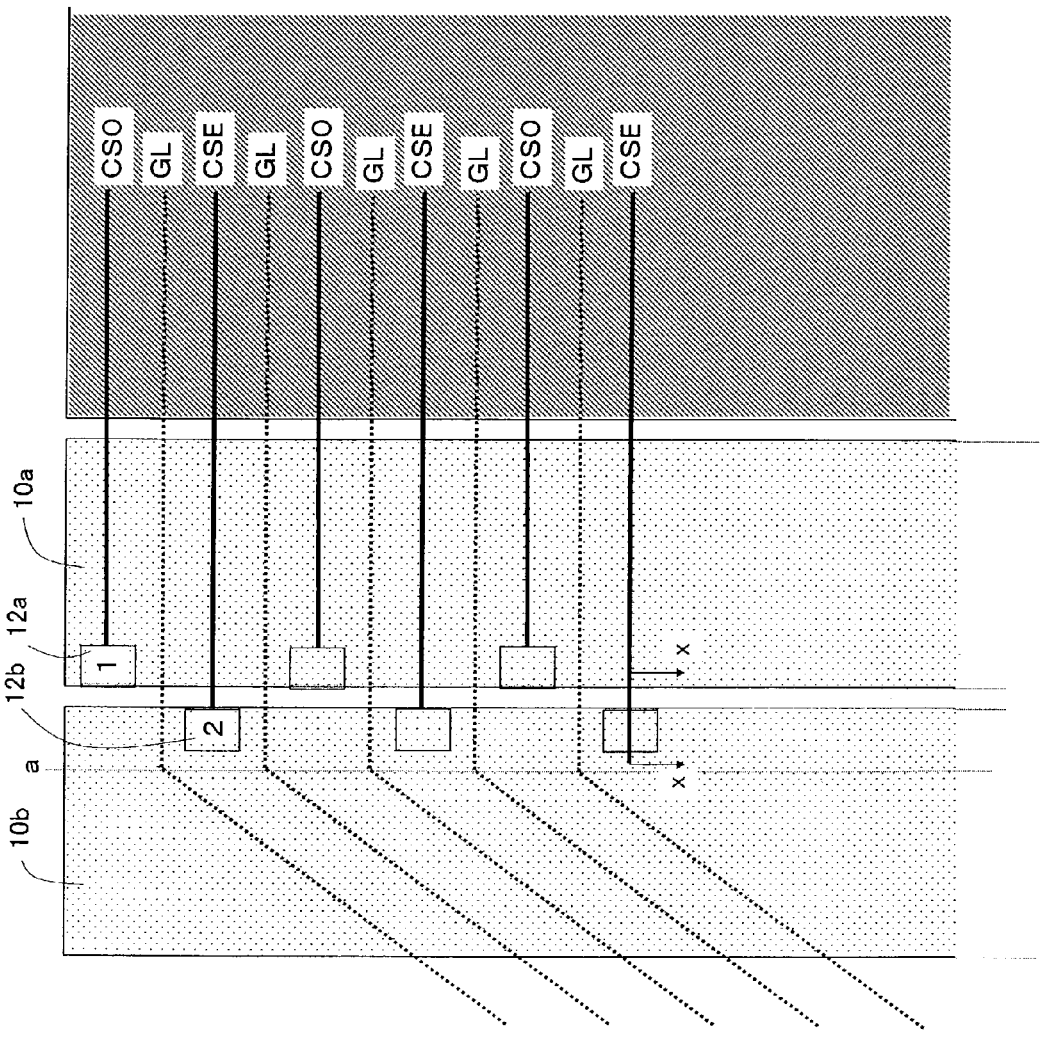
FIG.5A
FIG.5B

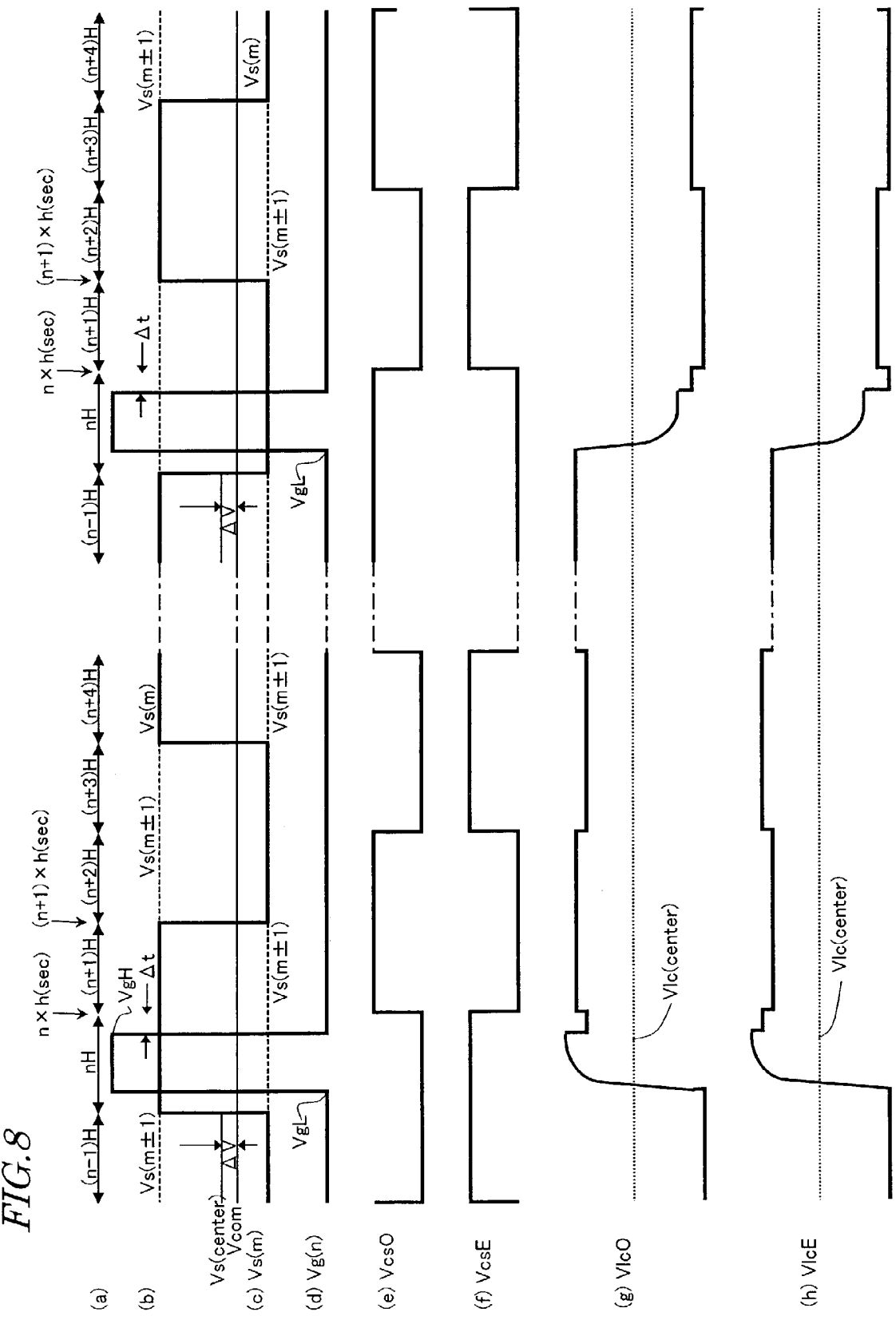

ACTIVE-MATRIX SUBSTRATE AND DISPLAY DEVICE

BACKGROUND OF THE INVENTION

1. Field of the Invention

The present invention relates to an active-matrix substrate and a display device. More particularly, the present invention relates to an active-matrix substrate that can be used effectively in a liquid crystal display (LCD) as a monitor for a personal computer, a TV system or a display panel for a mobile electronic unit, for example.

2. Description of the Related Art

An LCD is a flat-panel display that has a number of advantageous features including high resolution, drastically reduced thickness and weight, and low power dissipation. The LCD market has been rapidly expanding recently as a result of tremendous improvements in its display performance, significant increases in its productivity, and a noticeable rise in its cost effectiveness over competing technologies.

The LCD has a structure in which a liquid crystal layer is sandwiched as a display medium layer between two opposed substrates. On one of the two substrates (i.e., on an active-matrix substrate), data (or source) lines, gate lines, and storage capacitor lines for use to create a storage capacitance to store a drain voltage are provided. In addition, switching elements, each of which is driven responsive to a gate signal that has been supplied through an associated one of the gate lines, and pixel electrodes, which are connected to those switching elements, are further arranged in a matrix configuration on the active-matrix substrate. A common electrode and other members are provided on the other substrate (i.e., a counter substrate). In the LCD, a predetermined voltage is applied to the liquid crystal layer through the common electrode and one of the pixel electrodes, thereby controlling the light modulating state of the liquid crystal layer. In this manner, the LCD can display an image thereon.

An active-matrix-addressed LCD that adopts a dot inversion drive technique is known as a typical active-matrix-addressed LCD. In the dot inversion drive technique, image signals to be supplied to a pair of adjacent pixels have mutually opposite polarities. An LCD of this type is disclosed in Japanese Laid-Open Publication No. 11-119193, for example. In the LCD disclosed in that publication, a common electrode, which is arranged so as to face respective pixel electrodes, is divided into multiple portions to be classified into two groups, to which signals having mutually opposite polarities are input. Also, storage capacitor lines (which will be referred to herein as "CS lines"), which are provided to create pixel storage capacitances, are also classified into two groups, to which two different signals are input as in the two groups of the common electrode. More specifically, the CS lines are classified into a group of odd-numbered CS lines and a group of even-numbered CS lines. Signals having mutually reverse phases and inverting their polarities periodically are input to these two groups.

When the CS lines are classified into two groups such that two different signals are supplied to those two groups (i.e., in driving the CS lines through two different routes), two CS trunk lines, each of which is commonly connected to an associated one of the two groups of CS lines, are typically arranged separately in the picture frame area of the active-matrix substrate (i.e., in the area outside of the display area). The predetermined signal is supplied to each group of CS lines by way of one of the two CS trunk lines.

In this case, however, the two signals to be supplied to the two groups of CS lines by way of the two CS trunk lines need to satisfy a predetermined relationship with respect to each other. To supply such signals successfully, it is important to equalize the electrical resistances of the respective CS lines that are connected to the CS trunk lines. This is because if the CS lines have significantly different electrical resistances, then even the same signal cannot be transmitted through the CS lines at the same transfer rate. That is to say, the signal being transmitted through a CS line with relatively high electrical resistance is delayed significantly from the same signal being transmitted through a CS line with a relatively low electrical resistance. In that case, the signals that are actually supplied to the respective CS lines may not satisfy the desired relationship.

Also, when two groups of CS lines are connected to two separately arranged CS trunk lines as described above, the wiring structure in the picture frame area gets relatively complicated. In that case, it is rather difficult to extend some other lines, provided between CS lines, from the area including the CS trunk line to the outer periphery of the active-matrix substrate. Such a problem can be resolved by expanding the picture frame area. However, the expansion of the picture frame area is not preferable because that is against the recent downsizing trend.

As described above, in designing an active-matrix substrate including two groups of lines to be driven by way of two different routes, the wiring structure thereof needs to be defined such that signals can be supplied appropriately to the respective groups of lines while striking an adequate balance with the other lines to be arranged.

SUMMARY OF THE INVENTION

In order to overcome the problems described above, preferred embodiments of the present invention provide an active-matrix substrate in which two groups of lines are arranged appropriately and also provide a display device including such an active-matrix substrate.

An active-matrix substrate according to a preferred embodiment of the present invention preferably includes a plurality of switching elements, a base plate, a first trunk line with a first group of connecting pads, a second trunk line with a second group of connecting pads, a first group of lines, and a second group of lines. The first and second trunk lines are preferably arranged on the base plate so as to be spaced apart from, but adjacent to, each other and are preferably supplied with signals electrically independently. The first group of lines is preferably provided on the base plate and preferably includes portions that are substantially parallel to each other. The second group of lines is also preferably provided on the base plate and also preferably includes portions that are substantially parallel to each other. In this active-matrix substrate, the first group of connecting pads is preferably provided near the second trunk line such that each line belonging to the first group is electrically connected to the first trunk line at an associated one of the connecting pads belonging to the first group near the second trunk line. The second group of connecting pads is preferably provided near the first trunk line such that each line belonging to the second group is electrically connected to the second trunk line at an associated one of the connecting pads belonging to the second group near the first trunk line.

This active-matrix substrate is typically used in a display device including a display medium layer such as a liquid crystal layer. In that case, the switching elements may be provided in the active area (i.e., the display area) of the display device, and the first and second groups of lines may extend through the active area and may be electrically connected to the first and second trunk lines, respectively, outside of the active area. An insulating layer may be provided between the first trunk line and the first group of lines and between the second trunk line and the second group of lines. In that case, the first trunk line or the second trunk line may partially overlap with the first group of lines or the second group of lines.

In one preferred embodiment of the present invention, when the first and second trunk lines extend in a first direction, the substantially parallel portions of the first and second groups of lines preferably extend in a second direction, which preferably defines a predetermined angle with the first direction, and the first and second groups of lines are preferably alternately arranged in the first direction.

In another preferred embodiment, each of the first and second trunk lines preferably includes a plurality of convex portions and a plurality of concave portions such that the convex portions of the first trunk line engage with the concave portions of the second trunk line and that the concave portions of the first trunk line engage with the convex portions of the second trunk line. In that case, at least some of the connecting pads in the first group are preferably provided in the convex portions of the first trunk line, and at least some of the connecting pads in the second group are preferably provided in the convex portions of the second trunk line.

In this particular preferred embodiment, the first and second groups of connecting pads are preferably arranged substantially in line.

In still another preferred embodiment, the first and second groups of lines are preferably storage capacitor lines, which are used to form storage capacitances, and a first signal and a second signal, which have mutually opposite polarities, are preferably supplied to the first and second groups of lines by way of the first and second trunk lines, respectively.

In yet another preferred embodiment, the connecting pads in at least one of the first and second groups are preferably arranged at a pitch that is shorter than a wiring pitch of the substantially parallel portions of the first or second group of lines.

In yet another preferred embodiment, the active-matrix substrate preferably further includes a third group of lines, which is preferably provided between the first and second groups of lines and which preferably extends across the first and second trunk lines while being electrically insulated from the first and second trunk lines.

An active-matrix substrate according to another preferred embodiment of the present invention preferably includes a plurality of switching elements, a base plate, a first trunk line with a first group of connecting pads, a second trunk line with a second group of connecting pads, a first group of lines, and a second group of lines. The first and second trunk lines are preferably provided on the base plate so as to be spaced apart from, but adjacent to, each other and are preferably supplied with signals electrically independently. The first group of lines is preferably provided on the base plate and preferably includes portions that are substantially parallel to each other. The second group of lines is also preferably provided on the base plate and also preferably includes portions that are substantially parallel to each other. In this active-matrix substrate, each line belonging to the first group is preferably electrically connected to the first trunk line at an associated one of the connecting pads belonging to the first group and each line belonging to the second group is preferably electrically connected to the second trunk line at an associated one of the connecting pads belonging to the second group. The connecting pads in the second group are preferably arranged at a pitch that is shorter than a wiring pitch of the substantially parallel portions of the second group of lines.

In one preferred embodiment of the present invention, at least one of the lines in the second group preferably includes a portion that is bent toward an associated one of the connecting pads belonging to the second group.

In another preferred embodiment, the active-matrix substrate preferably further includes a third group of lines, which is preferably provided between the first and second groups of lines and which preferably extends across the first and second trunk lines while being electrically insulated from the first and second trunk lines.

A display device according to yet another preferred embodiment of the present invention preferably includes the active-matrix substrate according to any of the preferred embodiments of the present invention described above, and a display medium layer provided on the active-matrix substrate.

In one preferred embodiment of the present invention, the display medium layer is preferably a liquid crystal layer. In that case, multiple pixels, each including a first sub-pixel and a second sub-pixel, are preferably defined for the display device. A storage capacitor counter electrode, which defines a storage capacitor for the first sub-pixel of one of the pixels, is preferably connected to an associated one of the lines belonging to the first group. A storage capacitor counter electrode, which defines a storage capacitor for the second sub-pixel of the pixel, is preferably connected to an associated one of the lines belonging to the second group.

In this particular preferred embodiment, two of the switching elements are preferably provided for the first and second sub-pixels of each pixel. The ON/OFF states of the two switching elements are controlled with a gate signal voltage that is supplied through a common gate line. When the two switching elements are ON, a source signal voltage is preferably applied to a sub-pixel electrode and a storage capacitor electrode, which are provided for each of the first and second sub-pixels, by way of a common source line.

In an active-matrix substrate according to a preferred embodiment of the present invention, signals are supplied to first and second trunk lines electrically independently, and signals are also supplied electrically independently to first and second groups of lines that are connected to the first and second trunk lines, respectively. In a similar arrangement of the prior art, however, if each pair of lines belonging to the first and second groups has significantly different wire lengths or electrical resistances, then the signals to be supplied to those lines may fail to satisfy the desired relationship. That is to say, either the timings at which those signals are supplied or the amplitude ratio of those signals may fail to satisfy the predetermined relationship. In contrast, in the active-matrix substrate of preferred embodiments of the present invention, the first group of lines is connected to the first trunk line at a first group of connecting pads, which is provided near the second trunk line, while the second group of lines is connected to the second trunk line at a second group of connecting pads, which is provided near the first trunk line. Accordingly, each pair of lines belonging to the first and second groups can have substantially the same wire length and/or wiring resistance as measured from their associated connecting pads. Thus, signals that satisfy the desired relationship can be supplied to the two groups of lines electrically independently.

Also, in an active-matrix substrate according to another preferred embodiment of the present invention, the connecting pads in at least one of the first and second groups are arranged at a pitch that is shorter than the wiring pitch of the first and/or second group(s) of lines. That is to say, in the area in which the first and/or second groups of connecting pads are provided (typically in the picture frame area of the display device), the first and/or second groups of lines can be bent toward their connecting pads. In such an arrangement, even if a third group of lines is provided between the first and second groups of lines, the third group of lines can be bent before the connecting pads and extended out of the substrate without crossing the first or second group of lines. Thus, the third group of lines can have a relatively small bend angle without increasing the size of the extension region such as the picture frame area. As a result, the third group of lines can be arranged at a relatively large pitch.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 5A is a plan view showing a portion of an active-matrix substrate including two groups of storage capacitor lines according to a first specific preferred embodiment of the present invention.

FIG. 5B is a plan view illustrating a portion of the active-matrix substrate shown in FIG. 5A on a larger scale.

FIG. 8 shows the waveforms of voltages to be applied to drive the LCD panel shown in FIG. 7.

DETAILED DESCRIPTION OF PREFERRED EMBODIMENTS

Hereinafter, preferred embodiments of the present invention will be described with reference to the accompanying drawings.

Figure 1:
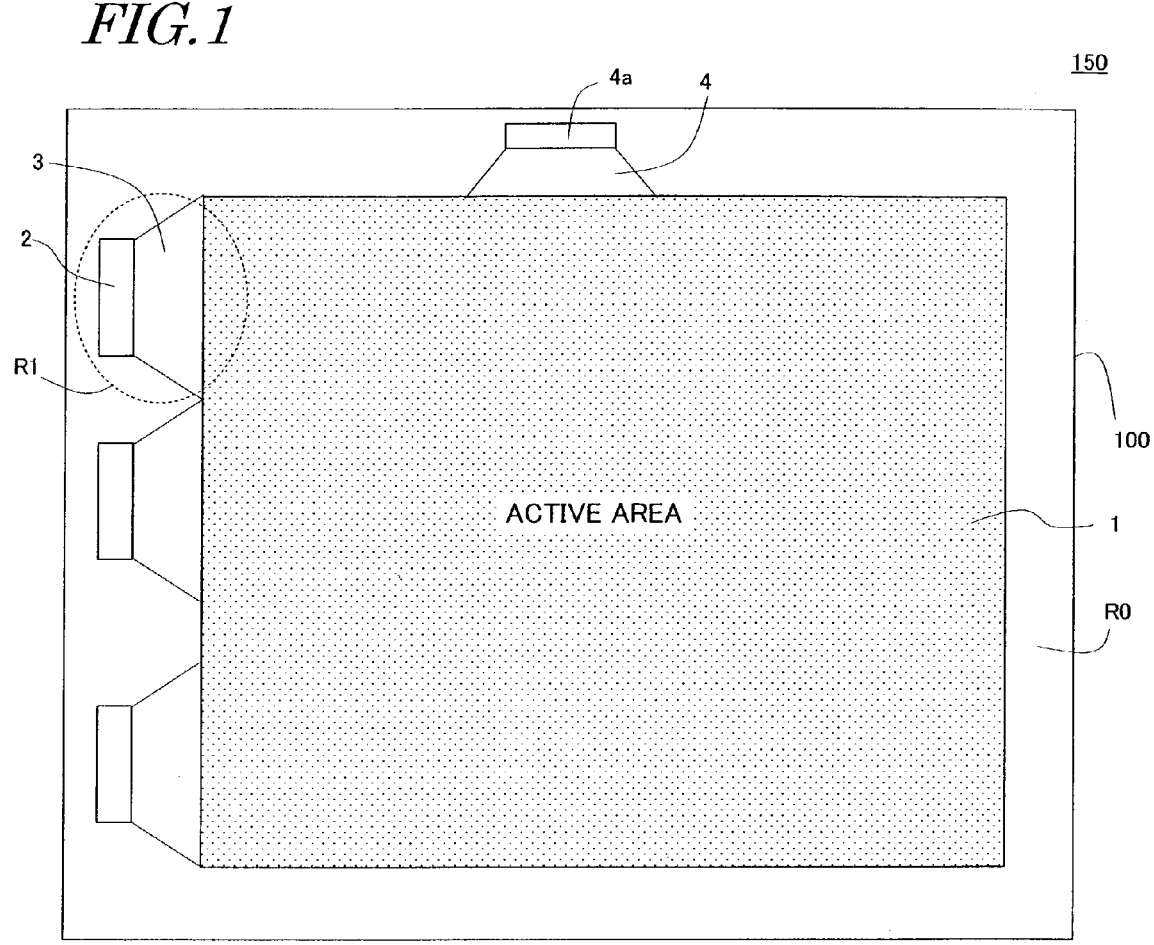
FIG. 1 is a plan view showing an active-matrix substrate according to a preferred embodiment of the present invention for use in an LCD panel.

FIG. 1 is a plan view schematically showing a layout for an LCD panel 150 including an active-matrix substrate 100 according to a first specific preferred embodiment of the present invention. As shown in FIG. 1, the LCD panel 150 preferably includes an active area 1, corresponding to the display area of the display device, and a picture frame area R0 surrounding the active area 1. In the active area 1, multiple pixels 21 are preferably arranged in columns and rows (see FIG. 7).

In the picture frame area R0 of the active-matrix substrate 100, multiple gate interconnecting regions R1 are preferably provided. In each of those gate interconnecting regions R1, a gate line GL (shown in FIG. 2), extending through the active area 1, is preferably electrically connected to its associated gate terminal 2 by way of a gate interconnecting portion 3. A source terminal 4a and a source interconnecting portion 4 for electrically connecting a source line SL, extending through the active area 1, to the source terminal 4a are preferably further provided in the picture frame area R0.

Figure 7:
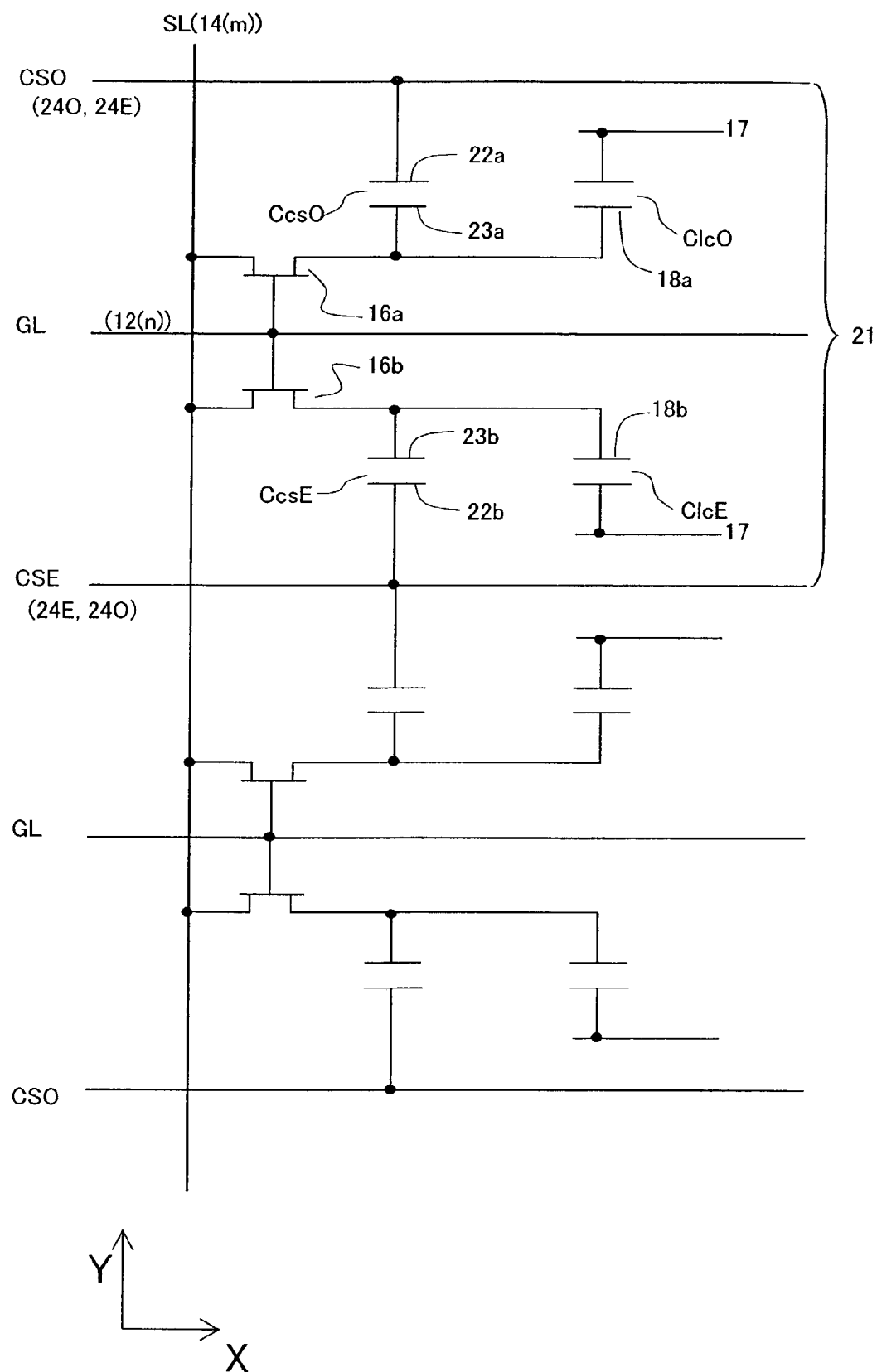
FIG. 7 is an equivalent circuit diagram of an LCD panel included in a liquid crystal display device according to a preferred embodiment of the present invention.

FIG. 7 is an equivalent circuit diagram of a portion of the active area 1 of the LCD panel 150 shown in FIG. 1. In the active area 1, the active-matrix substrate 100 preferably includes pixel electrodes 18a, 18b, etc., thin-film transistors (TFTs) 16a, 16b, etc. provided as switching elements for respective pixels 21, gate lines GL for controlling the ON/OFF states of the TFTs 16a, 16b, etc., a source line SL for supplying a predetermined voltage to the pixel electrodes 18a, 18b, etc., odd-numbered storage capacitor lines CSO and even-numbered storage capacitor lines CSE. The storage capacitor lines CSO and CSE are preferably connected to storage capacitor counter electrodes 22a and 22b, to create storage capacitances CcsO and CcsE, respectively. These lines CSO and CSE are preferably used to apply the predetermined voltage to the storage capacitor counter electrodes 22a and 22b, respectively.

On the other hand, a common electrode 17 is preferably located on a counter substrate (not shown), which is arranged so as to face the active-matrix substrate 100. As shown in FIG. 7, liquid crystal capacitors ClcO and ClcE are preferably located between the common electrode 17 and the pixel electrode 18a and between the common electrode 17 and the pixel electrode 18b, respectively. If necessary, color filters may be further provided for the counter substrate. The operation of an LCD panel having such a circuit configuration will be described in further detail later.

Figure 2:
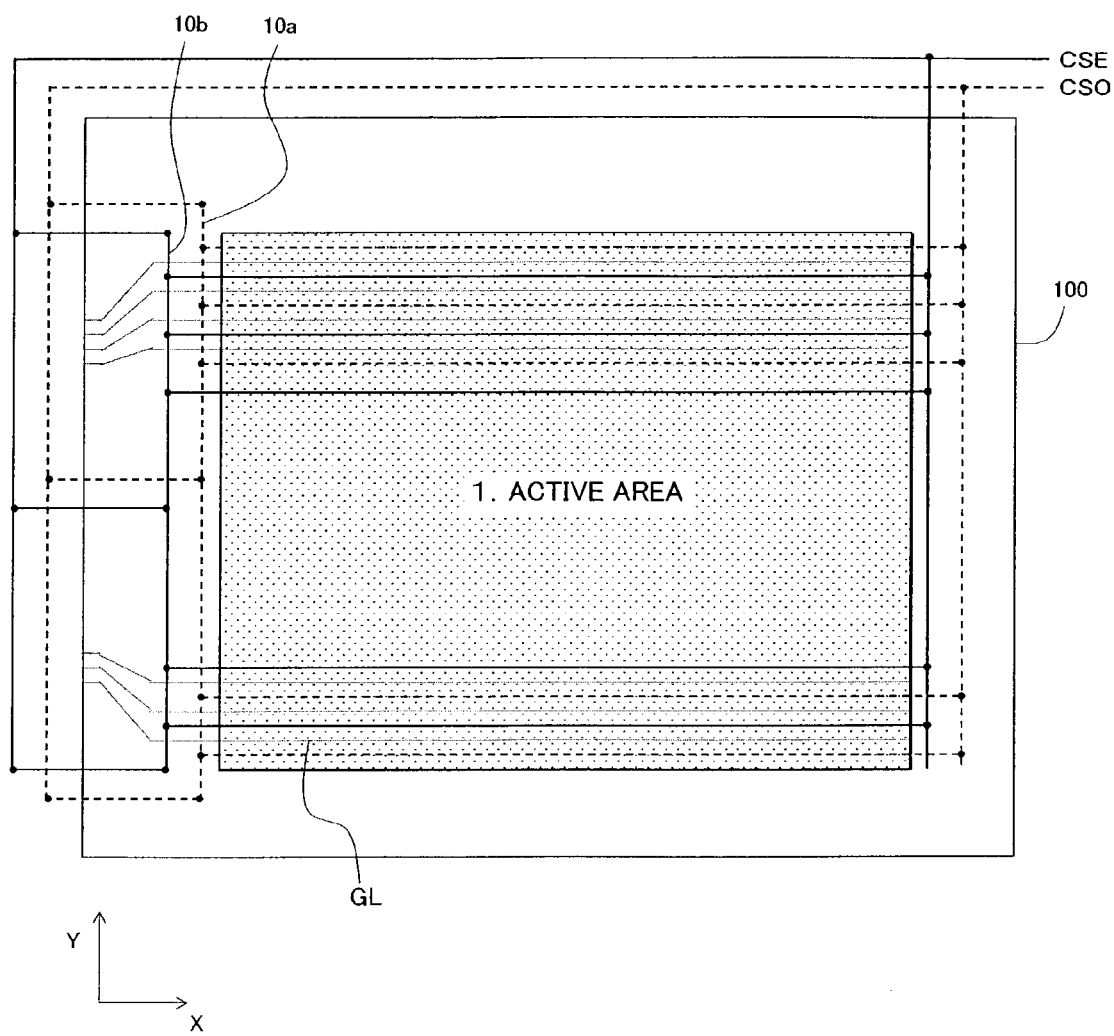
FIG. 2 is a plan view showing an arrangement of lines on the active-matrix substrate shown in FIG. 1.

FIG. 2 illustrates odd-numbered CS lines CSO (which will be sometimes referred to herein as "CSO lines"), even-numbered CS lines CSE (which will be sometimes referred to herein as "CSE lines"), and gate lines GL, all of which extend horizontally through the active area 1. As shown in FIG. 2, multiple CSO lines, which are substantially parallel to each other, and multiple CSE lines, which are also substantially parallel to each other, preferably extend horizontally through the active area 1 of the LCD panel 150 (i.e., in the X direction). The CSO and CSE lines are preferably alternately arranged vertically (i.e., in the Y direction). Each of the gate lines GL is preferably provided between a pair of vertically adjacent CS lines CSO and CSE.

Also, the odd-numbered CS lines CSO are preferably electrically connected to a common trunk line 10a (which will be sometimes referred to herein as a "CSO trunk line") in the gate interconnecting regions. On the other hand, the even-numbered CS lines CSE are preferably electrically connected to a common trunk line 10b (which will be sometimes referred to herein as a "CSE trunk line") in the gate interconnecting regions. The CSO and CSE trunk lines 10a and 10b preferably extend vertically through the LCD panel (i.e., in the Y direction), i.e., so as to define a predetermined angle with the X direction in which the CSE and CSO lines extend through the active area 1. In this preferred embodiment, the predetermined angle is preferably approximately 90 degrees. These trunk lines 10a and 10b are preferably electrically insulated from each other so as to be horizontally spaced apart from each other but adjacent to each other. These lines 10a and 10b are preferably supplied with signals electrically independently.

Hereinafter, the arrangement of the two groups of CS lines (i.e., the odd-numbered storage capacitor lines CSO and even-numbered storage capacitor lines CSE) in the gate interconnecting regions R1 of the active-matrix substrate 100 of this preferred embodiment shown in FIG. 5 will be described in comparison with two conventional arrangements shown in FIGS. 3 and 4.

First, the arrangement of a single group of CS lines in the gate interconnecting regions R1 of a conventional active-matrix substrate will be described with reference to FIG. 3. In this conventional active-matrix substrate, the same signal is supplied through all of the CS lines CSO and CSE, and therefore, these CS lines CSO and CSE are all electrically connected to the same CS trunk line 10 by way of connecting pads 12. The CS trunk line 10 may have a width Lcs6 of about 500 μm, for example, which is sufficiently greater than the line width of each of the CS lines (e.g., about 20 μm). Thus, the electrical resistance of the CS trunk line 10 is much lower than that of the CS lines CSE and CSO.

Figure 3:
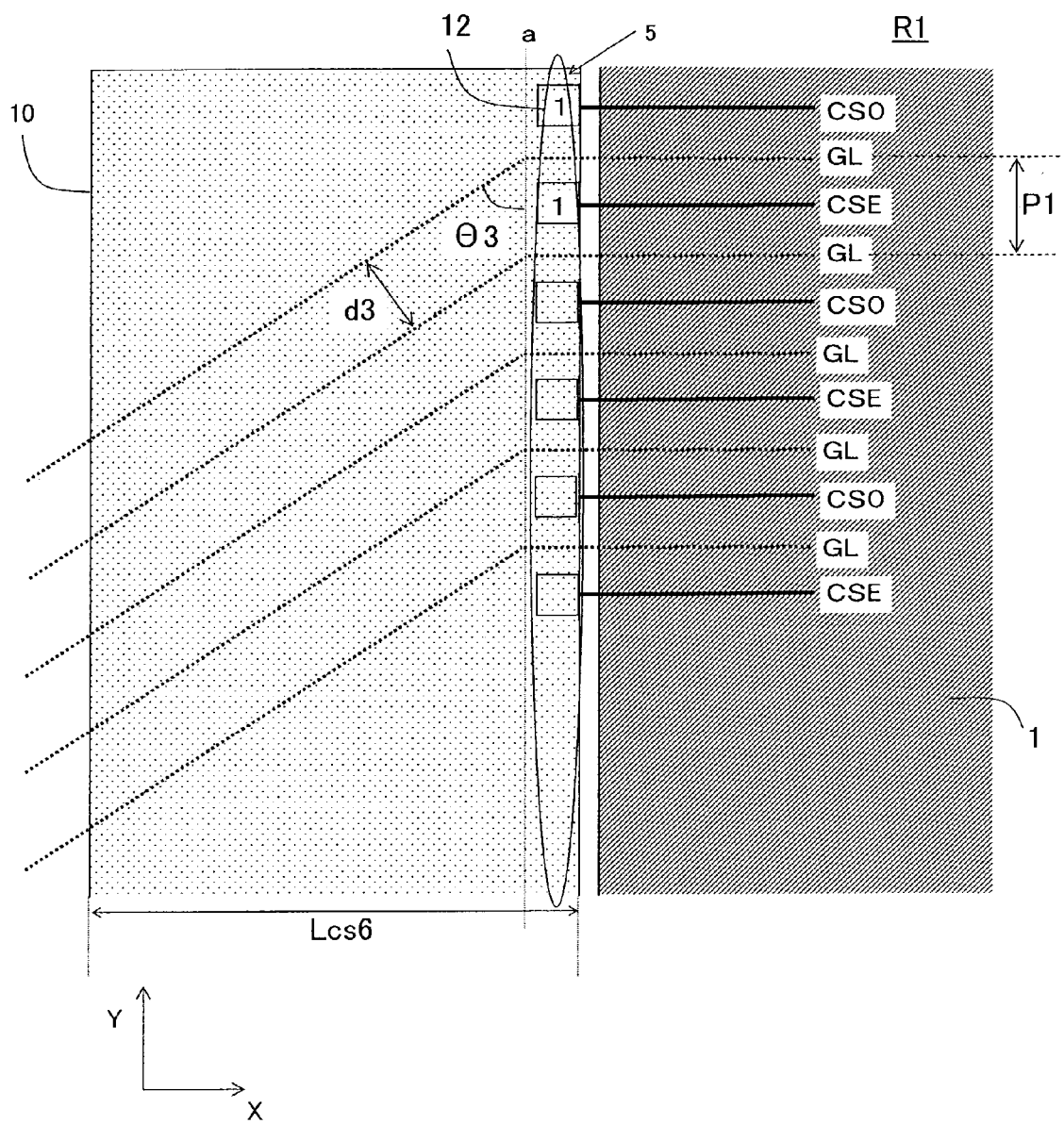
FIG. 3 is a plan view showing a portion of a conventional active-matrix substrate including a single group of storage capacitor lines.

In the conventional active-matrix substrate shown in FIG. 3, the connecting pads 12 of the CS lines CSO and CSE are arranged in line in the Y direction, i.e., in the direction in which the CS trunk line 10 extends. That is to say, in this CS line arrangement, the distances from the connecting pads 12 to the pixels belonging to a predetermined column are substantially equal to each other. In other words, all of these CS lines have substantially equal electrical resistances. Thus, the input signal can be supplied through the respective CS lines in a desired state. In this arrangement, however, the CS lines in the single group are driven simultaneously. Accordingly, it is impossible to adopt the dot inversion drive technique such as that disclosed in Japanese Laid-Open Publication No. 11-119193 identified above for this conventional arrangement.

Next, the arrangement of two groups of CS lines in the gate interconnecting regions R1 of another conventional active-matrix substrate will be described with reference to FIG. 4. As shown in FIG. 4, a CSO trunk line 10a and a CSE trunk line 10b are provided on this active-matrix substrate so as to be spaced apart from, but adjacent to, each other. The CSO lines are electrically connected to the CSO trunk line 10a by way of connecting pads 12a, while the CSE lines are electrically connected to the CSE trunk line 10b by way of connecting pads 12b.

Figure 4:
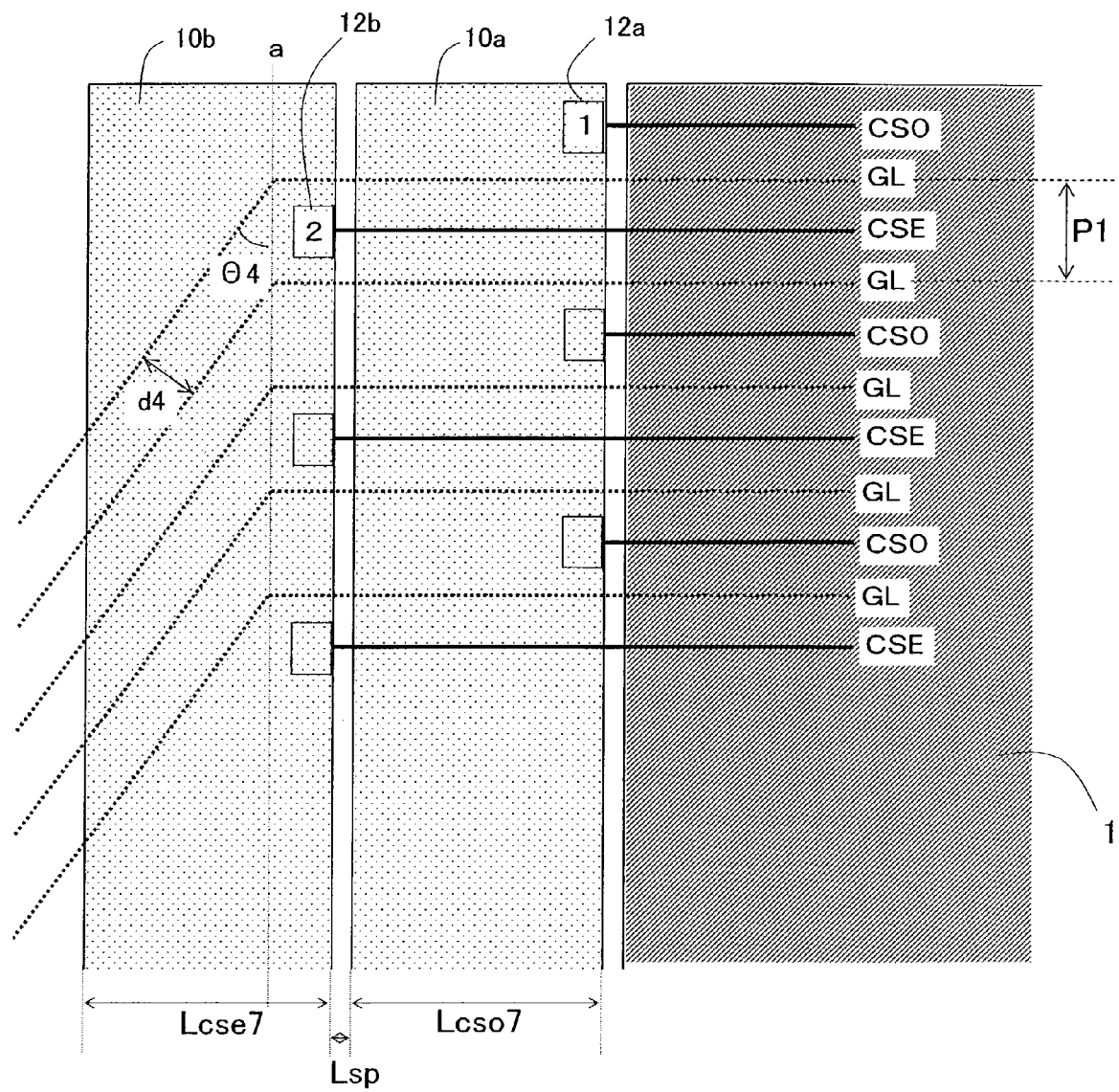
FIG. 4 is a plan view showing a portion of another conventional active-matrix substrate including two groups of storage capacitor lines.

In the arrangement shown in FIG. 4, however, the connecting pads 12a are arranged along the right edge of the CSO trunk line 10a and the connecting pads 12b are arranged along the right edge of the CSE trunk line 10b. That is to say, these two groups of connecting pads 12a and 12b are located rather distant from each other in the X direction (i.e., horizontally). Accordingly, even if the same signal is supplied to the CSO and CSE trunk lines 10a and 10b, the signal to be actually supplied to the CSE lines becomes different from the signal to be actually supplied to the CSO lines due to the difference in length (i.e., difference in electrical resistance) between the CSE and CSO lines. That is to say, if two signals that satisfy a desired relationship are supplied electrically independently to the CSO and CSE trunk lines 10a and 10b, respectively, then signal voltages that fail to meet the desired relationship might be applied to the CSO and CSE lines.

Also, in the arrangement shown in FIG. 4, the CSE lines are longer than the CSO lines by the width of the CSO trunk line 10a. Thus, difference will be produced between the wiring resistance of the CSO lines and that of the CSE lines. To reduce that difference in wiring resistance, the CSE lines may be shortened by decreasing the width of the CSO trunk line 10a. Then, the CSE trunk line 10b also has to have a decreased width to equalize the resistances of the CSO and CSE trunk lines 10a and 10b with each other. In that case, however, the overall electrical resistance rises, which is not preferable.

In the arrangement of this preferred embodiment shown in FIG. 5A, the CSO and CSE trunk lines 10a and 10b are preferably provided on the active-matrix substrate so as to be spaced apart from, but adjacent to, each other as in the conventional arrangement shown in FIG. 4. Also, the CSO lines are preferably electrically connected to the CSO trunk line 10a by way of connecting pads 12a, while the CSE lines are preferably electrically connected to the CSE trunk line 10b by way of connecting pads 12b. FIG. 5B shows a preferred width of the connecting pads 12a and 12b and a preferred distance between the CS trunk lines 10a and 10b.

In the preferred embodiment shown in FIG. 5A, however, the connecting pads 12a that connect the CSO lines to the CSO trunk line 10a are preferably provided near the CSE trunk line 10b, and the connecting pads 12b that connect the CSE lines to the CSE trunk line 10b are preferably provided near the CSO trunk line 10a. That is to say, in this preferred embodiment, the two groups of connecting pads 12a and 12b are located sufficiently close to each other. It should be noted that when we say "the connecting pads 12a are provided near the CSE trunk line 10b", we mean that the connecting pads 12a are arranged on the CSO trunk line 10a so as to be closer to the right edge of the CSE trunk line 10b than to the centerline of the CSO trunk line 10a. In the same way, when we say "the connecting pads 12b are provided near the CSO trunk line 10a", we mean that the connecting pads 12b are arranged on the CSE trunk line 10b so as to be closer to the left edge of the CSO trunk line 10a than to the centerline of the CSE trunk line 10b.

By providing the two groups of connecting pads 12a and 12b at such locations, the length of the CSO lines (as measured from the connecting pads 12a to the pixels belonging to a predetermined column) and the length of the CSE lines (as measured from the connecting pads 12b to pixels belonging to the predetermined column) can be substantially equalized with each other. In this case, the lengths of each pair of CSO and CSE lines are preferably measured from its associated pair of connecting pads 12a and 12b to its associated pair of pixels that are adjacent to each other in the Y direction. In this manner, two signals that satisfy a desired relationship can be appropriately supplied to the two groups of CS lines just as intended.

As described above, according to the arrangement of this preferred embodiment, when signals are supplied to two groups of lines to be driven electrically independently, those signals can satisfy a desired relationship in terms of timing or amplitude (root-mean-square value). In a typical preferred embodiment, the signals being supplied to the two groups of lines can be synchronized with each other and can have an appropriate amplitude ratio.

More specifically, if the difference in wiring resistance between two groups of lines due to the difference in wire length between them is minimized, then two signals, satisfying desired reversed phase relationship, can be appropriately supplied to the two groups of CS lines in an LCD panel, for example. Thus, the dot inversion driving method can be carried out just as intended by utilizing the driving technique disclosed in Japanese Laid-Open Publication No. 11-119193 identified above. As a result, the power dissipation of the LCD panel can be reduced drastically and the display quality thereof can be improved significantly.

Figure 6:
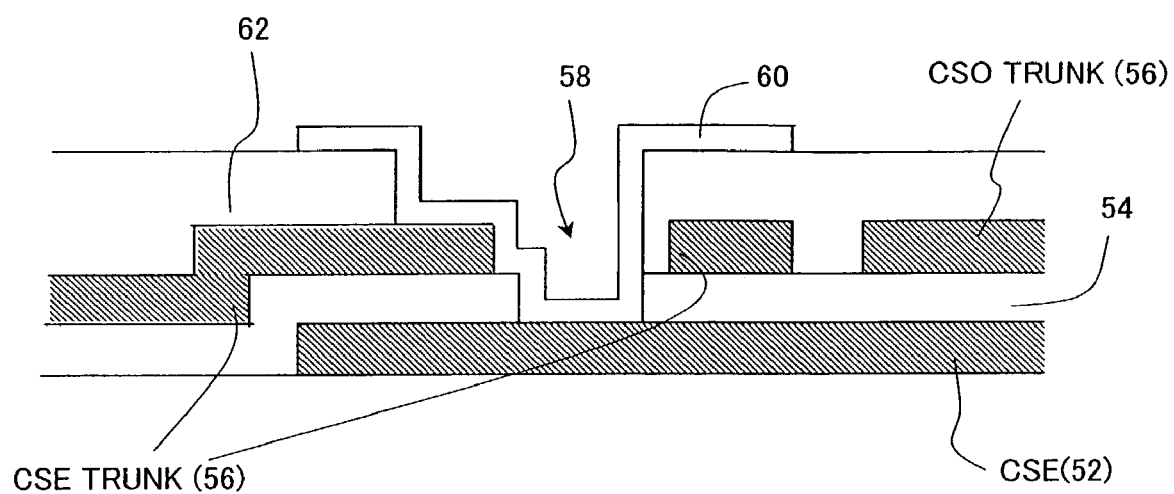
FIG. 6 is a cross-sectional view showing the connecting pad of a CS line as viewed on the plane VI—VI shown in FIG. 5.

In the active-matrix substrate 100 of the preferred embodiment described above, the CSO and CSE lines may be connected to the CSO and CSE trunk lines 10a and 10b at the two groups of connecting pads 12a and 12b, respectively, as shown in FIG. 6, for example. FIG. 6 is a cross-sectional view of the active-matrix substrate as viewed on the plane VI–VI shown in FIG. 5A. As shown in FIG. 6, a CSE line 52, which belongs to the same layer as a gate line (not shown), is preferably covered with an insulating layer 54, which may be used as a gate insulating film. The CSO and CSE trunk lines 56, which belong to the same layer as a source line (not shown), are preferably provided on the insulating layer 54. The CSE line 52 and the CSE trunk line 56 obtained in this manner are preferably electrically connected together through an indium tin oxide (ITO) film 60, which belongs to the same layer as pixel electrodes (not shown), at a contact hole 58 that has been formed through the insulating layer 54 by an etching process, for example. In this manner, the CS lines can be electrically connected to the CS trunk line. In the example illustrated in FIG. 6, the ITO film 60 is preferably provided on an interlevel dielectric film 62. Also, the manufacturing processing steps of forming the CS lines and the CS trunk lines may be carried out simultaneously with the manufacturing processing steps of forming TFTs and pixel electrodes in the active area. Thus, there is no need to add any extra processing step to the conventional LCD panel manufacturing process.

When the CSO and CSE lines are connected to the CSO and CSE trunk lines 10a and 10b in this manner, the CSE lines overlap with the CSO trunk line 10a with the insulating layer 54 interposed between them and form capacitances between them as can be seen from FIG. 5A. However, those capacitances are also connected to the CSO lines. Accordingly, no capacitance difference is produced between the CSO and CSE lines, thus posing no driving problem.

Hereinafter, an exemplary liquid crystal display device, including an LCD panel 150 that uses the active-matrix substrate 100 described above, will be described with reference to FIGS. 7 and 8.

FIG. 7 is an equivalent circuit diagram of the active area of the LCD panel. This LCD panel is an active-matrix-addressed LCD panel including a number of pixels (which will be sometimes referred to herein as "dots") that are arranged in columns and rows (or in a matrix). The pixel 21 shown in FIG. 7 is supposed to be located at the intersection between the $n^{th}$ row and the $m^{th}$ column.

The pixel 21 preferably includes a first sub-pixel and a second sub-pixel. In FIG. 7, a liquid crystal capacitor associated with the first sub-pixel is identified by ClcO, while a liquid crystal capacitor associated with the second sub-pixel is identified by ClcE. The liquid crystal capacitor ClcO of the first sub-pixel is preferably defined by a first sub-pixel electrode 18a, the common electrode 17 and a liquid crystal layer being disposed between them. On the other hand, the liquid crystal capacitor ClcE of the second sub-pixel is preferably defined by a second sub-pixel electrode 18b, the common electrode 17 and the liquid crystal layer being disposed between them. The first sub-pixel electrode 18a is preferably connected to a signal line 14 (i.e., the source line SL) by way of the TFT 16a and the second sub-pixel electrode 18b is preferably connected to the same signal line 14 by way of the TFT 16b. The gate electrodes of the TFTs 16a and 16b are preferably connected to the same scan line 12 (i.e., the gate line GL).

As shown in FIG. 7, a first storage capacitor CcsO is preferably provided for the first sub-pixel and a second storage capacitor CcsE is preferably provided for the second sub-pixel. The storage capacitor electrode 23a of the first storage capacitor CcsO is preferably connected to the drain of the TFT 16a, while the storage capacitor electrode 23b of the second storage capacitor CcsE is preferably connected to the drain of the TFT 16b. However, these storage capacitor electrodes 23a and 23b do not have to be connected as shown in FIG. 7 but may be electrically connected in any other way as long as the voltage applied to their associated sub-pixel electrodes 18a and 18b is also applied to these storage capacitor electrodes 23a and 23b. That is to say, each sub-pixel electrode and its associated storage capacitor electrode need to be electrically connected together either directly or indirectly.

The storage capacitor counter electrode 22a of the first storage capacitor CcsO is preferably connected to a CSO line (i.e., a storage capacitor line 24O or 24E), while the storage capacitor counter electrode 22b of the second storage capacitor CcsE is preferably connected to a CSE line (i.e., a storage capacitor line 24E or 24O). In this circuit configuration, mutually different storage capacitor voltages can be applied to the storage capacitor counter electrodes 22a and 22b of the first and second storage capacitors CcsO and CcsE. Each pair of storage capacitor counter electrode and storage capacitor line may be connected appropriately according to the drive method adopted (e.g., dot inversion drive technique). It should be noted that the same gate insulating film may be used in common as an insulating layer for these two storage capacitors.

Hereinafter, it will be described with reference to FIG. 8 how mutually different voltages can be applied to the liquid crystal capacitors ClcO and ClcE of the first and second sub-pixels in the circuit configuration shown in FIG. 7.

FIG. 8 shows the voltage waveforms and timings of respective signals to be supplied to the pixel (n, m) shown in FIG. 7. In FIG. 8, portion (a) shows two horizontal scanning periods H corresponding to two frame periods. Portion (b) shows the waveform of a source signal voltage Vs(m±1) to be supplied to the $(m±1)^{th}$ source lines 14 (as indicated by dashed line). Portion (c) shows the waveform of a source signal voltage (i.e., gray scale signal voltage) Vs(m) to be supplied to the $m^{th}$ source line 14 (as indicated by the solid line). Portion (d) shows the waveform of a gate signal voltage Vg(n) to be supplied to the $n^{th}$ gate line 12. Portions (e) and (f) show the waveforms of storage capacitor counter voltages VcsO and VcsE to be supplied to the storage capacitor lines 24O and 24E, respectively. And portions (g) and (h) show the waveforms of voltages VlcO and VlcE to be applied to the liquid crystal capacitors ClcO and ClcE of the first and second sub-pixels, respectively.

The drive method shown in FIG. 8 is a preferred embodiment of the present invention which is designed to drive a 2H dot-inversion and frame-inversion type liquid crystal display device.

Specifically, in the liquid crystal display device of the 2H dot-inversion and frame-inversion type, every time two gate lines have been selected (i.e., every time two horizontal scanning periods 2H have passed), the source signal voltage Vs supplied to the source line 14 inverts its polarities and the source signal voltages Vs supplied to two adjacent source lines (e.g., Vm and V(m±1)) have mutually opposite polarities. In this manner, the 2H dot-inversion drive is carried out. Also, the source signal voltages Vs supplied to the source lines 14 all invert their polarities every frame, thus performing the frame-inversion drive.

In this case, the period in which the storage capacitor counter voltages VcsO and VcsE invert their polarities is equal to the period (i.e., 2H) in which the source signal voltage inverts its polarities. The waveforms of the storage capacitor counter voltages VcsO and VcsE are out of phase with that of the source signal voltage by half period (i.e., 1H). Also, the waveforms of the storage capacitor counter voltages VcsO and VcsE have the same amplitude but two different phases that are shifted from each other by 180 degrees.

Next, it will be described with reference to FIG. 8 why the voltages VlcO and VlcE applied to the liquid crystal capacitors ClcO and ClcE change their waveforms as shown in FIG. 8.

When the gate signal voltage Vg is at high level VgH, the TFTs 16a and 16b are turned ON to apply the source signal voltage Vs on the source line 14 to the sub-pixel electrodes 18a and 18b. The voltage VlcO between the two terminals of the liquid crystal capacitor ClcO is defined as the difference between the voltage Vs applied to the sub-pixel electrode 18a and the voltage Vcom applied to the common electrode 17. In the same way, the voltage VlcE between the two terminals of the liquid crystal capacitor ClcE is defined as the difference between the voltage Vs applied to the sub-pixel electrode 18b and the voltage Vcom applied to the common electrode 17. That is to say, VlcO=Vs−Vcom and VlcE=Vs−Vcom.

In (n×h−Δt) seconds, the gate signal voltage Vg drops from its ON-state high voltage VgH to its OFF-state low voltage VgL (<Vs). Then, due to a so-called "pulling" phenomenon, the voltage applied to the sub-pixel electrodes 18a and 18b decreases by ΔV. Thus, the voltage Vcom applied to the common electrode 17 is decreased to a value that is lower than the center potential of the source signal voltage Vs by this difference ΔV.

Thereafter, in (n×h) seconds, the voltage VlcO applied to the liquid crystal capacitor ClcO changes because of being affected by the voltage VcsO at the storage capacitor counter electrode 22a of the storage capacitor CcsO, which is electrically connected to the sub-pixel electrode 18a of the liquid crystal capacitor ClcO. At the same time, the voltage VlcE applied to the liquid crystal capacitor ClcE also changes because of being affected by the voltage VcsE at the storage capacitor counter electrode 22b of the storage capacitor CcsE, which is electrically connected to the sub-pixel electrode 18b of the liquid crystal capacitor ClCE. Suppose the storage capacitor counter voltage VcsO increases by VcsOp (>0) and the storage capacitor counter voltage VcsE decreases by VcsEp (>0) in (n×h) seconds. That is to say, the full amplitude (Vp−p) of the storage capacitor counter voltage VcsO is supposed to be VcsOp and the full amplitude of the storage capacitor counter voltage VcsE is supposed to be VcsEp.

The voltage VlcO applied to the liquid crystal capacitor ClCO is given by:

$$VlcO = Vs - \Delta V + VcsOp(CcsO/CpixO) - Vcom$$

where CpixO is the total capacitance of the liquid crystal capacitor ClcO and storage capacitor CcsO that are connected to the drain of the TFT 16a.

On the other hand, the voltage VlcE applied to the liquid crystal capacitor ClcE is given by:

$$VlcE = Vs - \Delta V - VcsEp(CcsE/CpixE) - Vcom$$

where CpixE is the total capacitance of the liquid crystal capacitor ClcE and storage capacitor CcsE that are connected to the drain of the TFT 16b.

Next, in (n+2)×h seconds (i.e., at the beginning of (n+3) H), the voltages VlcO and VlcE applied to the liquid crystal capacitors ClcO and ClcE are affected by the storage capacitor counter voltages VcsO and VcsE to regain their original values at the end of nH:

$$VlcO = Vs - \Delta V - Vcom$$

$$VlcE = Vs - \Delta V - Vcom$$

These voltage variations are repeatedly produced until Vg(n) reaches the VgH level in the next frame. As a result, VlcO and VlcE come to have mutually different root-mean-square values.

Thus, the root-mean-square values VlcOrms and VlcErms of VlcO and VlcE are given by:

$$VlcOrms = Vs - \Delta V + (1/2)VcsOp(CcsO/CpixO) - Vcom$$

$$VlcErms = Vs - \Delta V - (1/2)VcsEp(CcsE/CpixE) - Vcom$$

where (Vs−ΔV−Vcom)>>VcsOp(CcsO/CpixO) and (Vs−ΔV−Vcom)>>VcsEp(CcsE/CpixE). Accordingly, the difference between these root-mean-square values ΔVlc (=VlcOrms−VlcErms) is given by:

$$\Delta Vlc = (1/2)\{VcsOp(CcsO/CpixO) + VcsEp(CcsE/CpixE)\}$$

Supposing the liquid crystal capacitances of the two sub-pixels are equal to each other and the storage capacitances thereof are also equal to each other (i.e., ClcO=ClcE=Clc, CcsO=CcsE=Ccs, and CpixO=CpixE=Cpix), $$\Delta Vlc = (1/2)(VcsOp + VcsEp)(Ccs/Cpix)$$

If VcsOp=VcsEp but VcsO and VcsE have two different phases that are shifted from each other by 180 degrees as shown in FIG. 8 and if VcsOp=VcsEp=Vcsp, then $$\Delta Vlc = Vcsp(Ccs/Cpix)$$

As a result, VlcO has a relatively large root-mean-square value and VlcE has a relatively small root-mean-square value.

It should be noted that if the voltages VcsO and VcsE are interchanged with each other, then VlcO may have a relatively small root-mean-square value and VlcE may have a relatively large root-mean-square value. Alternatively, VlcO and VlcE may also have a relatively small root-mean-square value and a relatively large root-mean-square value, respectively, even when the storage capacitor counter electrodes of the storage capacitors CcsO and CcsE are connected to the opposite storage capacitor lines 24E and 24O, respectively.

In this preferred embodiment, the frame inversion drive is preferably carried out. Thus, in the next frame, Vs inverts its polarity and Vlc<0. However, if the polarities of VcsO and VcsE are also inverted simultaneously, similar effects are achieved.

Also, in this preferred embodiment, the source signal voltages being supplied to each pair of adjacent source lines 14 preferably have mutually opposite polarities to perform the dot inversion drive. Accordingly, in the next frame, the pixel (n, m) will be driven in the same way as two pixels (n, m±1) that are horizontally adjacent to (i.e., belong to the same row n as) the pixel (n, m) with respect to the source line 14.

Hereinafter, the polarity distribution of the voltages to be applied to respective pixels (or liquid crystal capacitors) in a frame, the combinations of storage capacitor counter voltages (or storage capacitor lines) of the pixels, and the distribution of the root-mean-square voltages to be applied to the sub-pixels of the respective pixels will be described with reference to the following Tables 1, 2 and 3, respectively. The data shown in these three tables were obtained by driving the liquid crystal display device by the method shown in FIG. 8.

TABLE 1

|       | m − 1 | m | m + 1 | m + 2 |
|-------|-------|---|-------|-------|
| n − 1 | +     | − | +     | −     |
| n     | −     | + | −     | +     |
| n + 1 | −     | + | −     | +     |
| n + 2 | +     | − | +     | −     |

TABLE 2

|       | m − 1 | m   | m + 1 | m + 2 |
|-------|-------|-----|-------|-------|
| n − 1 | 24O   | 24E | 24O   | 24E   |
|       | 24E   | 24O | 24E   | 24O   |
| n     | 24E   | 24O | 24E   | 24O   |
|       | 24O   | 24E | 24O   | 24E   |
| n + 1 | 24O   | 24E | 24O   | 24E   |
|       | 24E   | 24O | 24E   | 24O   |
| n + 2 | 24E   | 24O | 24E   | 24O   |
|       | 24O   | 24E | 24O   | 24E   |

TABLE 3

|       | m − 1     | m         | m + 1     | m + 2     | 24E |
|-------|-----------|-----------|-----------|-----------|-----|
| n − 1 | Clc/Ccs-E | Clc/Ccs-O | Clc/Ccs-E | Clc/Ccs-O |     |
|       | Clc/Ccs-O | Clc/Ccs-E | Clc/Ccs-O | Clc/Ccs-E | 24O |
| n     | Clc/Ccs-E | Clc/Ccs-O | Clc/Ccs-E | Clc/Ccs-O |     |
|       | Clc/Ccs-O | Clc/Ccs-E | Clc/Ccs-O | Clc/Ccs-E | 24E |
| n + 1 | Clc/Ccs-O | Clc/Ccs-E | Clc/Ccs-O | Clc/Ccs-E |     |
|       | Clc/Ccs-O | Clc/Ccs-E | Clc/Ccs-O | Clc/Ccs-E | 24O |
| n + 2 | Clc/Ccs-E | Clc/Ccs-O | Clc/Ccs-E | Clc/Ccs-O |     |
|       | Clc/Ccs-O | Clc/Ccs-E | Clc/Ccs-O | Clc/Ccs-E | 24E |

As can be seen from Table 1, when the drive method shown in FIG. 8 is adopted, the 2H dot inversion drive, in which the polarities of the voltages being applied to the respective pixels invert every third row and every column, can be carried out. In the frame next to that shown in Table 1, all of these polarities will be inverted (i.e., frame inversion will be achieved).

In this preferred embodiment, if the combinations of storage capacitor lines shown in Table 2 are adopted for the respective pixels such that the sub-pixel electrodes of each of those pixels are connected to their associated combination of storage capacitor lines by way of the storage capacitor counter electrodes of their associated storage capacitors, then the distribution of root-mean-square voltages shown in Table 3 can be obtained. In Table 2, the reference numeral 24O or 24E shown on the upper row of each cell denotes the storage capacitor line 24O or 24E, to which the storage capacitor counter electrode to be combined with the sub-pixel electrode 18a is connected. On the other hand, the reference numeral 24O or 24E shown on the lower row of each cell denotes the storage capacitor line 24O or 24E, to which the storage capacitor counter electrode to be combined with the sub-pixel electrode 18b is connected. In the same way, in Table 3, the upper row of each cell represents the root-mean-square voltage to be applied to the sub-pixel (or liquid crystal capacitor) formed by the sub-pixel electrode 18a, while the lower row of each cell represents the root-mean-square voltage to be applied to the sub-pixel (or liquid crystal capacitor) formed by the sub-pixel electrode 18b. In Table 3, the sub-pixel root-mean-square voltage with "O" is relatively high, while the sub-pixel root-mean-square voltage with "E" is relatively low.

As can be seen from Table 3, when the drive method shown in FIG. 8 is adopted, the 2H dot inversion drive can be carried out as shown in Table 1 and the root-mean-square voltages to be applied to the respective sub-pixels alternate their levels on a sub-pixel basis both in the column and row directions. When the distribution of the root-mean-square voltages to be applied to the respective sub-pixels has such a high spatial frequency, an image of quality can be displayed.

In the LCD panel described above, the same source signal voltage is preferably supplied through the common source line 14 to the sub-pixel electrodes 18a and 18b by way of their associated TFTs 16a and 16b, respectively. The gate electrodes of the TFTs 16a and 16b are preferably integrated with their common gate line 12 and are preferably provided between the sub-pixel electrodes 18a and 18b. The sub-pixel electrodes 18a and 18b are preferably provided symmetrically with respect to the gate line 12. In this preferred embodiment, the sub-pixel electrodes 18a and 18b preferably have the same area. Also, the storage capacitor counter electrodes are preferably integrated with the storage capacitor lines 24O and 24E. Each of the storage capacitor lines 24O and 24E is preferably shared by multiple pairs of pixels that are adjacent to each other in the Y direction.

The preferred embodiment of the present invention described above is preferably a TFT liquid crystal display device. Alternatively, the liquid crystal display device may also use any other type of switching elements such as MIMs.

The LCD panel described above preferably uses the active-matrix substrate 100. Thus, the storage capacitor counter voltages VcsO and VcsE, of which the waveforms have the same amplitude but two different phases that are shifted from each other by 180 degrees as shown in portions (e) and (f) of FIG. 8, can be appropriately supplied to the CSO and CSE lines 24O and 24E, respectively. Accordingly, in pixel-by-pixel driving, the voltage being applied to the liquid crystal layer, which changes with the amplitude of the storage capacitor counter voltage, can be controlled just as intended. As described above, in performing the dot inversion drive in which voltages with mutually opposite polarities are applied to two groups of CS lines to be driven electrically independently, the display device of this preferred embodiment appropriately changes the root-mean-square voltages being applied to the liquid crystal layer, thus displaying an image of quality.

Hereinafter, an active-matrix substrate according to a second specific preferred embodiment of the present invention will be described.

Figure 9B:
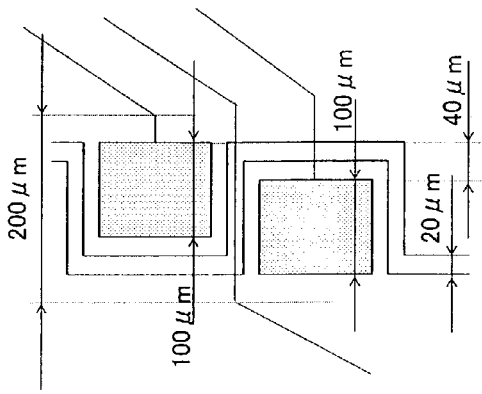
FIG. 9B is a plan view illustrating a portion of the active-matrix substrate shown in FIG. 9A on a larger scale.
Figure 9A:
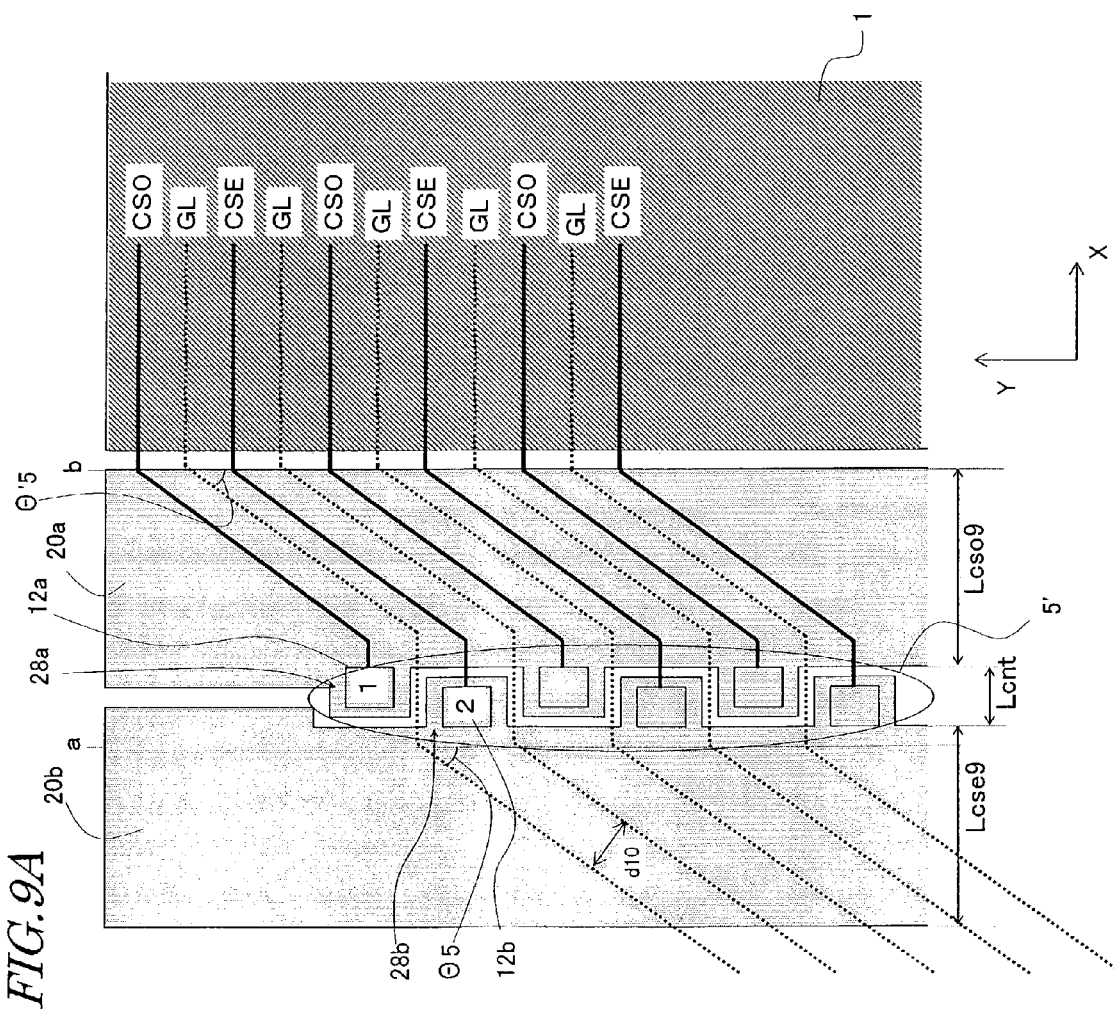
FIG. 9A is a plan view showing a portion of an active-matrix substrate including two groups of storage capacitor lines according to a second specific preferred embodiment of the present invention.

FIG. 9A is a plan view showing, on a larger scale, a gate interconnecting region R1 (see FIG. 1) in an active-matrix substrate according to the second preferred embodiment. In the active-matrix substrate of this preferred embodiment, a CSO trunk line 20a and a CSE trunk line 20b are also preferably provided on the base plate so as to be separated from, but adjacent to, each other as in the first preferred embodiment described above. A group of CSO lines is preferably connected electrically to the CSO trunk line 20a by way of connecting pads 12a, while a group of CSE lines is preferably connected electrically to the CSE trunk line 20b by way of connecting pads 12b. In this second preferred embodiment, however, the CSO trunk line 20a preferably includes convex portions 28a, the CSE trunk line 20b also preferably includes convex portions 28b, and these two groups of convex portions 28a and 28b are preferably alternately arranged in the Y direction so as to engage with each other. And the connecting pads 12a are preferably provided in these convex portions 28a and the connecting pads 12b are preferably provided in these convex portions 28b. These two groups of connecting pads 12a and 12b, provided in the two groups of convex portions 28a and 28b, respectively, are preferably arranged in line vertically. It should be noted that when a line passing through all of these connecting pads 12a and 12b can be drawn, the connecting pads 12a and 12b are regarded herein as being arranged in line. FIG. 9B shows a preferred width of the connecting pads 12a and 12b and a preferred width of a gap between the CS trunk lines 20a and 20b.

In such an arrangement, each pair of CSO and CSE lines can have substantially the same wire length (or electrical resistance). Thus, as in the first preferred embodiment described above, signals can be appropriately supplied to these two groups of CS lines electrically independently.

Also, in this preferred embodiment, the length of each convex portion 28a or 28b including the connecting pad 12a or 12b (which will be referred to herein as a "contact region" 5) as measured in the Y direction is preferably shorter than the length of a region, allocated to the CS line to be connected to the CS trunk line 20a or 20b in the contact region 5, as measured in the active area 1 in the Y direction. That is to say, at least some of the CSO lines and at least some of the CSE lines are preferably bent at points b near the boundary between the active area 1 and the gate interconnecting region R1. In that case, the arrangement pitches of the connecting pads 12a and 12b are preferably smaller than those of the CSO and CSE lines in the active area 1.

Hereinafter, it will be described with reference to FIGS. 3, 4, 9A, 9B, 10A, 10B and 10C why the contact region 5 has a decreased length in the Y direction.

Figure 10C:
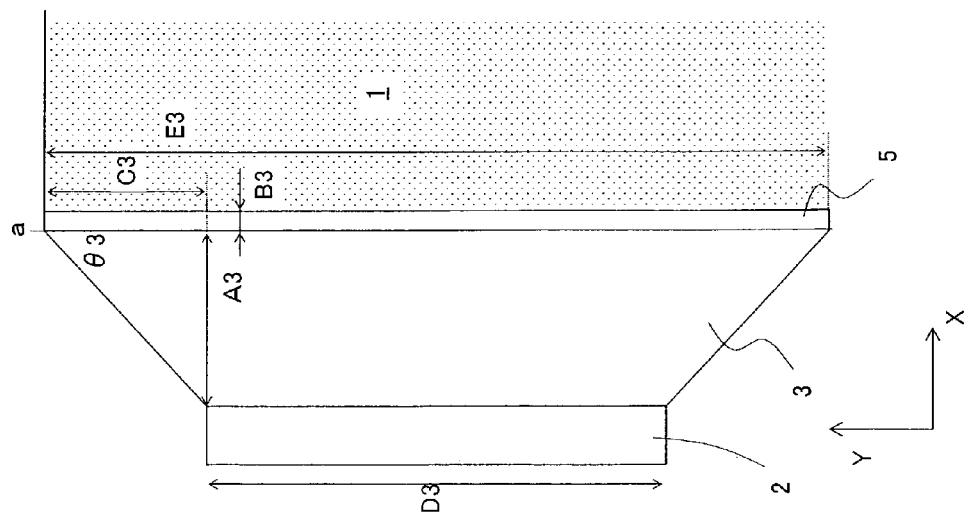
FIG. 10C is a plan view corresponding to the active-matrix substrate of the second preferred embodiment shown in FIG. 9A.
Figure 10B:
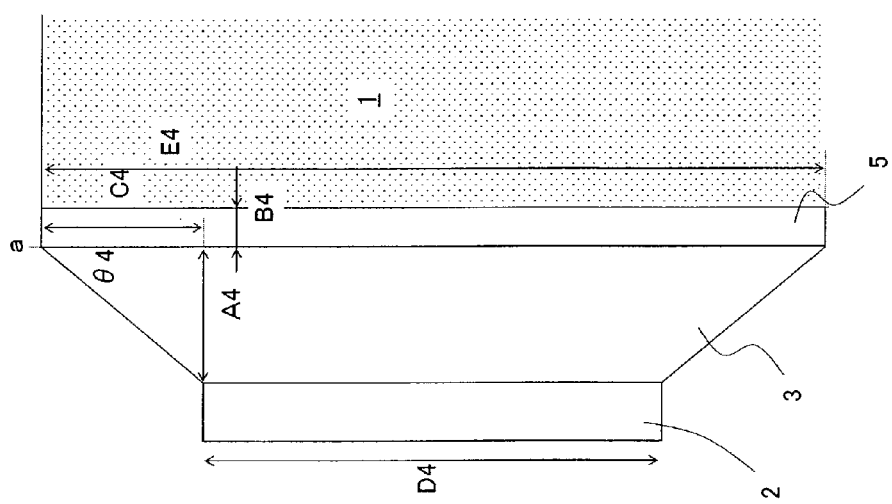
FIG. 10B is a plan view corresponding to the conventional active-matrix substrate shown in FIG. 4.
Figure 10A:
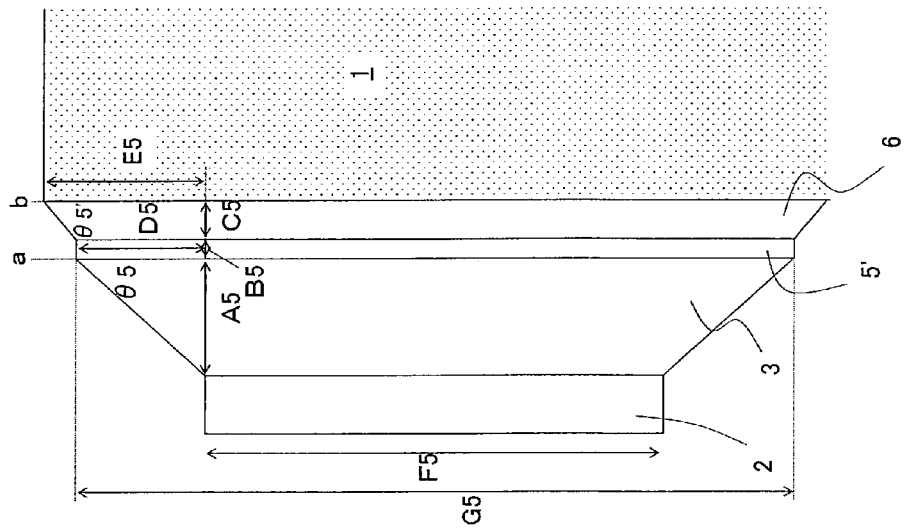
FIG. 10A is a plan view corresponding to the conventional active-matrix substrate shown in FIG. 3.

FIGS. 10A, 10B and 10C show the gate terminal portion 2, the gate interconnecting portion (extended portion) 3, the contact region 5 and the active area 1 in the gate interconnecting regions R1 of the conventional active-matrix substrate with the single group of CS lines shown in FIG. 3, the conventional active-matrix substrate with the two groups of CS lines shown in FIG. 4, and the active-matrix substrate of the second preferred embodiment shown in FIG. 9A, respectively. In each of these three types of arrangements, the CS lines and gate lines are alternately arranged in the Y direction in the active area 1. The CS lines are connected to the CS trunk line(s) in the contact region 5. On the other hand, the gate lines are extended to the gate terminal portion 2 while being converged in the gate interconnecting portion 3 that is provided outside of the contact region 5. Some of the gate lines are bent at the points a that are located along the left edge of the contact region 5.

In the interconnecting structure shown in FIG. 4 (i.e., in the arrangement shown in FIG. 10B), the width B4 of the contact region 5 for electrically connecting the CS lines to the CS trunk lines is greater than the width B3 of the contact region 5 in the interconnecting structure shown in FIG. 3 that uses the single group of CS lines (i.e., in the arrangement shown in FIG. 10A). These widths B4 and B3 are supposed to be measured in the X direction. This is because in the interconnecting structure shown in FIG. 4, two CS trunk lines 10a and 10b are provided such that the CS lines are also connected to the CS trunk line 10b that is located closer to the outer periphery of the active-matrix substrate. In this case, the width B4 of the contact region 5 is greater than the width of the inner CS trunk line 10a at least. In the examples shown in FIGS. 10A and 10B, the length E3 of the contact region 5 shown in FIG. 10A is substantially equal to the length E4 of the contact region 5 shown in FIG. 10B as measured in the Y direction.

If these two types of interconnecting structures shown in FIGS. 10A and 10B have the contact regions 5 with mutually different widths B3 and B4 and picture frame areas with the same width (i.e., supposing A3+B3=A4+B4 ), then the width A4 of the gate interconnecting portion 3 shown in FIG. 10B becomes smaller than the width A3 of the gate interconnecting portion 3 shown in FIG. 10A. Accordingly, in the arrangement shown in FIG. 10B, the gate lines, which are extended toward the gate terminal portion 2 while being converged in the gate interconnecting portion 3, must be bent at a sharper angle at the bending points a (i.e., $\theta3>\theta4$). When the distance from the upper end of the gate terminal portion 2 to the upper end of the contact region 5 as measured in the Y direction is identified by C3 or C4 as shown in FIGS. 10A and 10B, $\tan\theta3=A3/C3$ and $\tan\theta4=A4/C4$. In the examples shown in FIGS. 10A and 10B, the length D3 of the gate terminal portion 2 shown in FIG. 10A is substantially equal to the length D4 of the gate terminal portion 2 shown in FIG. 10B as measured in the Y direction.

When the two types of interconnecting structures shown in FIGS. 10A and 10B have mutually different gate line bending angles $\theta3$ and $\theta4$ in their extended portions, the gate line pitches d3 and d4 in their gate interconnecting portions 3 (i.e., the distance between the centers of two adjacent gate lines) are given by $d3=P1\sin\theta3$ and $d4=P1\sin\theta4$ (where P1 is the gate line pitch in the active area 1) as can be seen from FIGS. 3 and 4. In this case, since $\theta3>\theta4$, the gate line pitch d4 of the arrangement shown in FIG. 4 is narrower than the gate line pitch d3 of the arrangement shown in FIG. 3. Accordingly, if the interconnecting structure shown in FIG. 4 is used for the two groups of CS lines, the gate line pitch decreases in the extended portion, thus possibly decreasing the yield of final products.

In the examples shown in FIGS. 10A and 10B, the two interconnecting structures are supposed to have substantially equal picture frame widths. To equalize the gate line pitches d3 and d4 in the gate interconnecting portions 3 of these two types of arrangements, the width A4 of the gate interconnecting portion 3 shown in FIG. 4 needs to be greater than the width A3 of the gate interconnecting portion 3 shown in FIG. 3. Thus, the active-matrix substrate shown in FIG. 4 should have a picture frame area with an increased width, which is not advantageous.

In contrast, in this preferred embodiment, a gate/CS interconnecting portion 6 is preferably provided between the contact region 5' and the active area 1 as shown in FIGS. 9A and 10C. In this gate/CS interconnecting portion 6, the gate lines and CS lines, which have been bent at the bending points b near the boundary of the active area 1, are provided. That is to say, in this preferred embodiment, the contact region 5' is located at a midpoint of the gate lines that extend from the active area 1 toward the gate terminal portion 2 while being converged toward the gate terminal portion 2. Thus, as measured in the Y direction, the length G5 of the contact region 5' is shorter than the length of a portion of the active area 1 including the associated CS lines (corresponding to the lengths E3 and E4 of the contact regions 5 shown in FIGS. 10A and 10B). That is to say, E3=E4>G5. In this case, the arrangement pitch of the CS line connecting pads provided in the contact region 5' is smaller than that of the CS lines extending substantially parallel to each other through the active area 1.

In this preferred embodiment, the gate lines and CS lines, extended from the active area 1, are preferably bent before reaching the contact region 5'. Thus, the gate lines can be bent at greater angles θ5 and θ5' without being bent at such a sharp angle θ4 as that shown in FIGS. 4 and 10B. Then, the gate line pitch d10 shown in FIG. 9A can be greater than the gate line pitch d4 shown in FIGS. 4 and 10B. As a result, the yield can be increased.

The arrangement of this preferred embodiment will be described in further detail with reference to FIG. 10C. Specifically, in this arrangement, the gate/CS line angle (i.e., the bending angle at the bending points b) θ5', which determines the pitch of the gate lines and CS lines in the gate/CS interconnecting portion 6, preferably satisfies:

$$\tan \theta 5' = C5/(E5-D5)$$

where C5 is the width of the gate/CS interconnecting portion 6 as measured in the X direction, E5 is the distance from the upper end of the gate terminal portion 2 to that of the gate/CS interconnecting portion 6 as measured in the Y direction, and D5 is the distance from the upper end of the gate terminal portion 2 to that of the contact region 5' as measured in the Y direction.

On the other hand, the angle θ5 at which the gate lines, extending from the contact region 5' toward the gate terminal portion 2, are bent at the bending points a, preferably satisfies:

$$\tan \theta 5 = A5/D5$$

where A5 is the width of the gate interconnecting portion 3 as measured in the X direction.

Also, the arrangement shown in FIG. 10C has the same picture frame width as the arrangements shown in FIGS. 10A and 10B. That is to say, A3+B3=A4+B4=A5+B5+C5, where B5 is the width of the contact region 5' as measured in the X direction. Furthermore, the length F5 of the gate terminal portion 2 as measured in the Y direction for the arrangement shown in FIG. 10C is the same as the arrangements shown in FIGS. 10A and 10B. That is to say, F5=D3=D4.

Hereinafter, more specific designs for the gate interconnecting regions R1 will be described with reference to FIGS. 3, 4 and 9A and FIGS. 10A, 10B and 10C.

In FIG. 3, Lcs6 denotes the width of the CS trunk line 10 as measured in the X direction. In FIG. 4, Lcso7 and Lcse7 respectively denote the widths of the CSO and CSE trunk lines 10a and 10b as measured in the X direction and Lsp denotes the width of the gap between the CSO and CSE trunk lines 10a and 10b as also measured in the X direction.

The sum of these widths Lcso7, Lsp and Lcse7 is preferably equal to the width Lcs6 of the CS trunk line 10 shown in FIG. 3 (i.e., Lcs6=Lcso7+Lsp+Lcse7).

In FIG. 9A, Lcso9 and Lcse9 respectively denote the widths of the effective CSO and CSE trunk lines 20a and 20b as measured in the X direction and Lcnt denotes the width of the contact region 5' as measured in the X direction. The sum of these widths Lcso9, Lcnt and Lcse9 is preferably equal to the width Lcs6 of the CS trunk line 10 shown in FIG. 3 (i.e., Lcs6=Lcso9+Lcnt+Lcse9).

When the gate terminal pitch was about 100 μm, the number of gate lines provided was 250, the pixel pitch in the active area 1 was about 400 μm and the distance from the end of the gate terminal portion 2 to that of the active area 1 was kept constant, the active-matrix substrates shown in FIGS. 3, 4 and 9A (i.e., the arrangements shown in FIGS. 10A, 10B and 10C) were designed so as to have the following sizes:

A3=2.85 mm, B3=150 μm, C3=12.5 mm, D3=25 mm, and E3=100 mm in the arrangement shown in FIG. 10A;

A4=2.33 mm, B4=670 μm, C4=12.5 mm, D4=25 mm, and E4=100 mm in the arrangement shown in FIG. 10B; and A5=2.39 mm, B5=200 μm, C5=410 μm, D5=11.8 mm, E5=12.5 mm, F5=25 mm and G5=48.6 mm in the arrangement shown in FIG. 10C.

In this case, θ3=12.8 degrees, θ4=10.6 degrees and θ5=11.5 degrees and the gate line pitches d3, d4 and d10 were 55.1 μm, 45.4 μm and 49.32 μm, respectively. Thus, by adopting the arrangement of this preferred embodiment, the resultant gate line pitch d10 could be greater than the gate line pitch d4 shown in FIG. 4 by about 4 μm.

On the other hand, when the gate line pitches d3, d4 and d10 were all fixed at about 30 μm, the picture frame areas of the active-matrix substrates shown in FIGS. 10A, 10B and 10C had widths sum3 (=A3+B3), sum4 (=A4+B4) and sum5 (=A5+B5+C5) of about 1,673 μm, about 2,193 μm and about 1,974 μm, respectively.

Thus, by adopting the arrangement of this preferred embodiment, the picture frame width can be reduced by about 220 μm as compared with the conventional arrangement using two groups of CS lines.

Also, when the conventional arrangement including two groups of CS lines as shown in FIG. 4 was designed so as to have the sizes specified above and when the CS lines had a resistivity ρ of about 3, a thickness d of about 1,500 Å and a width 1 of about 12 μm, the CSE lines showed a wiring resistance of about 0 Ω, the CSO lines showed a wiring resistance of about 0.083 Ω and the difference in electrical resistance was about 0.083 Ω. These resistances were measured between their connecting pads and the active area. On the other hand, in the arrangement of the first preferred embodiment also including two groups of CS lines as shown in FIG. 5, the difference in length between the CSO and CSE lines was about 120 μm and the difference in electrical resistance could be reduced to about 0.02 Ω. Furthermore, in the second preferred embodiment shown in FIG. 9A, the difference in length between the CSO and CSE lines was about 40 μm and the difference in electrical resistance could be further reduced to about 0.067 Ω.

In an active-matrix substrate including two groups of lines to be driven electrically independently according to any of various preferred embodiments of the present invention described above, each group of connecting pads for use to connect an associated one of the two groups of lines to an associated one of two trunk lines is preferably provided near the other trunk line that is associated with the other group of lines. Thus, the difference in electrical resistance between each pair of lines belonging to the two groups can be reduced significantly, and signals can be supplied to the two lines just as intended. This arrangement can be used effectively in a liquid crystal display device to be driven by a dot inversion drive technique, for example, such that signals are appropriately supplied to respective groups of storage capacitor lines electrically independently. Consequently, the resultant image quality improves.

While the present invention has been described with respect to preferred embodiments thereof, it will be apparent to those skilled in the art that the disclosed invention may be modified in numerous ways and may assume many embodiments other than those specifically described above. Accordingly, it is intended that the appended claims cover all modifications of the invention that fall within the true spirit and scope of the invention.

What is claimed is:

1. An active-matrix substrate comprising:
a plurality of switching elements;
a base plate;
a first trunk line and a second trunk line, which are provided on the base plate so as to be spaced apart from, but adjacent to, each other, are supplied with signals electrically independently, and include a first group of connecting pads and a second group of connecting pads, respectively;
a first group of lines, which is provided on the base plate and which includes portions that are substantially parallel to each other; and
a second group of lines, which is provided on the base plate and which includes portions that are substantially parallel to each other;
wherein the first group of connecting pads is arranged near the second trunk line such that each line belonging to the first group is electrically connected to the first trunk line at an associated one of the connecting pads belonging to the first group near the second trunk line; and
wherein the second group of connecting pads is arranged near the first trunk line such that each line belonging to the second group is electrically connected to the second trunk line at an associated one of the connecting pads belonging to the second group near the first trunk line.

2. The active-matrix substrate of claim 1, wherein when the first and second trunk lines extend in a first direction, the substantially parallel portions of the first and second groups of lines extend in a second direction, which defines a predetermined angle with the first direction, and the first and second groups of lines are alternately arranged in the first direction.

3. The active-matrix substrate of claim 1, wherein each of the first and second trunk lines includes a plurality of convex portions and a plurality of concave portions such that the convex portions of the first trunk line engage with the concave portions of the second trunk line and that the concave portions of the first trunk line engage with the convex portions of the second trunk line, and
wherein at least some of the connecting pads in the first group are provided in the convex portions of the first trunk line, and
wherein at least some of the connecting pads in the second group are provided in the convex portions of the second trunk line.

4. The active-matrix substrate of claim 3, wherein the first and second groups of connecting pads are arranged substantially in line.

5. The active-matrix substrate of claim 1, wherein the first and second groups of lines are storage capacitor lines, which are used to provide storage capacitances, and
wherein a first signal and a second signal, which have mutually opposite polarities, are supplied to the first and second groups of lines by way of the first and second trunk lines, respectively.

6. The active-matrix substrate of claim 1, wherein the connecting pads in at least one of the first and second groups are provided at a pitch that is shorter than a wiring pitch of the substantially parallel portions of the first or second group of lines.

7. The active-matrix substrate of claim 6, further comprising a third group of lines, which is provided between the first and second groups of lines and which extends across the first and second trunk lines while being electrically insulated from the first and second trunk lines.

8. The active-matrix substrate of claim 1, wherein the first group of connecting pads is arranged along a right edge of the first trunk line and the second group of connecting pads is arranged along a left edge of the second trunk line.

9. The active-matrix substrate of claim 1, wherein a length of each of the first group of lines is substantially equal to a length of each of the second group of lines.

10. The active matrix substrate of claim 1, wherein at least some of the first group of lines and at least some of the second group of lines include bent portions near a boundary between an active area of the active matrix substrate and a gate interconnection region.

11. A display device comprising:
the active-matrix substrate of claim 1; and
a display medium layer provided on the active-matrix substrate.

12. The display device of claim 11, wherein the display medium layer is a liquid crystal layer, and
wherein multiple pixels, each including a first sub-pixel and a second sub-pixel, are provided for the display device, and
wherein a storage capacitor counter electrode, which provides a storage capacitor for the first sub-pixel of one of the pixels, is connected to an associated one of the lines belonging to the first group, and
wherein a storage capacitor counter electrode, which provides a storage capacitor for the second sub-pixel of the pixel, is connected to an associated one of the lines belonging to the second group.

13. The display device of claim 12, wherein two of the switching elements are provided for the first and second sub-pixels of each said pixel, and
wherein the ON/OFF states of the two switching elements are controlled with a gate signal voltage that is supplied through a common gate line, and
wherein when the two switching elements are ON, a source signal voltage is applied to a sub-pixel electrode and a storage capacitor electrode, which are provided for each of the first and second sub-pixels, by way of a common source line.

14. The display device of claim 11, wherein the display device is a dot-inversion and frame-Inversion liquid crystal display device.

15. An active-matrix substrate comprising:
a plurality of switching elements;
a base plate;
a first trunk line and a second trunk line, which are provided on the base plate so as to be spaced apart from, but adjacent to, each other, are supplied with signals electrically independently, and include a first group of connecting pads and a second group of connecting pads, respectively;

a first group of lines, which is provided on the base plate and which includes portions that are substantially parallel to each other; and a second group of lines, which is provided on the base plate and which includes portions that are substantially parallel to each other;

wherein each said line belonging to the first group is electrically connected to the first trunk line at an associated one of the connecting pads belonging to the first group, and wherein each said line belonging to the second group is electrically connected to the second trunk line at an associated one of the connecting pads belonging to the second group, and wherein the connecting pads in the second group are arranged at a pitch that is shorter than a wiring pitch of the substantially parallel portions of the second group of lines.

16. The active-matrix substrate of claim 15, wherein at least one of the lines in the second group includes a portion that is bent toward an associated one of the connecting pads belonging to the second group.

17. The active-matrix substrate of claim 15, further comprising a third group of lines, which is provided between the first and second groups of fines and which extends across the first and second trunk lines while being electrically insulated from the first and second trunk lines.

18. The active-matrix substrate of claim 15, wherein the first group of connecting pads is arranged along a right edge of the first trunk line and the second group of connecting pads is arranged along a left edge of the second trunk line.

19. The active-matrix substrate of claim 15, wherein a length of each of the first group of lines is substantially equal to a length of each of the second group of lines.

20. The active matrix substrate of claim 15, wherein at least some of the first group of lines and at least some of the second group of lines include bent portions near a boundary between an active area of the active matrix substrate and a gate interconnection region.

21. A display device comprising:

the active-matrix substrate of claim 15; and a display medium layer provided on the active-matrix substrate.

22. The display device of claim 21, wherein the display medium layer is a liquid crystal layer, and wherein multiple pixels, each including a first sub-pixel and a second sub-pixel, are defined for the display device, and wherein a storage capacitor counter electrode, which provides a storage capacitor for the first sub-pixel of one of the pixels, is connected to an associated one of the lines belonging to the first group, and wherein a storage capacitor counter electrode, which provides a storage capacitor for the second sub-pixel of the pixel, is connected to an associated one of the lines belonging to the second group.

23. The display device of claim 22, wherein two of the switching elements are provided for the first and second sub-pixels of each said pixel, and wherein the ON/OFF states of the two switching elements are controlled with a gate signal voltage that is supplied through a common gate line, and wherein when the two switching elements are ON, a source signal voltage is applied to a sub-pixel electrode and a storage capacitor electrode, which are provided for each of the first and second sub-pixels, by way of a common source line.

24. The display device of claim 21, wherein the display device is a dot-inversion and frame-inversion liquid crystal display device.

* * * * *